(12) United States Patent
Winterot et al.

(10) Patent No.: US 7,324,271 B2
(45) Date of Patent: Jan. 29, 2008

(54) LASER-SCANNING MICROSCOPE WITH COLLIMATOR AND/OR PINHOLE OPTICS

(75) Inventors: Johannes Winterot, Jena (DE); Michael Goelles, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 10/401,023

(22) Filed: Mar. 28, 2003

(65) Prior Publication Data

US 2004/0051941 A1  Mar. 18, 2004

(30) Foreign Application Priority Data

Apr. 17, 2002 (DE) ............................... 102 17 544

(51) Int. Cl.
*G02B 21/06* (2006.01)
*G02B 27/12* (2006.01)

(52) U.S. Cl. .................... 359/385; 359/368; 359/637; 359/641

(58) Field of Classification Search ........ 359/368–390, 359/634–641, 676–690, 362–363
See application file for complete search history.

(56) References Cited

U.S. PATENT DOCUMENTS

| | | | | |
|---|---|---|---|---|
| 4,312,572 A | * | 1/1982 | Yamashita et al. | 359/676 |
| 4,353,617 A | * | 10/1982 | Tokumitsu et al. | 359/221 |
| 4,708,444 A | | 11/1987 | Tsuji | 359/684 |
| 5,260,578 A | * | 11/1993 | Bliton et al. | 250/461.1 |
| 5,296,700 A | * | 3/1994 | Kumagai | 250/216 |
| 5,334,830 A | | 8/1994 | Fukuyama et al. | 250/216 |
| 5,596,452 A | * | 1/1997 | Yamakawa | 359/641 |
| 5,646,411 A | | 7/1997 | Kain et al. | 250/458.1 |
| 5,864,436 A | | 1/1999 | Noyes | 359/785 |
| 6,167,173 A | * | 12/2000 | Schoeppe et al. | 385/33 |
| 6,483,649 B2 | * | 11/2002 | Ozaki | 359/690 |
| 6,504,656 B1 | * | 1/2003 | Winterot et al. | 359/690 |
| 6,596,985 B2 | * | 7/2003 | Sakai et al. | 250/234 |
| 6,674,057 B1 | | 1/2004 | Wiegraebe et al. | 250/201.3 |
| 6,693,742 B1 | * | 2/2004 | Winterot et al. | 359/381 |
| 2004/0246572 A1 | | 12/2004 | Muller | 359/385 |

FOREIGN PATENT DOCUMENTS

| | | |
|---|---|---|
| DE | 38 04 642 A1 | 10/1988 |
| DE | 41 28 506 A | 3/1993 |

(Continued)

*Primary Examiner*—Thong Q Nguyen
(74) *Attorney, Agent, or Firm*—Jacobson Holman PLLC

(57) ABSTRACT

Laser-scanning microscope with at least one detection radiation input, in which an aperture plate is installed in front of the detector, whereby optics with variable transmission lengths and a fixed focal distance is provided for focusing varying wavelengths of the detected light onto the aperture plate level at the detection radiation path, which realizes the imaging from the infinite space into an image level with a finite conjugate distance,
and/or
with at least one light source launched via an optical fiber, whereby collimator optics with a fixed focal distance, and a variable conjugate distance are down-streamed from the fiber output, which transfers the point source at the fiber output with a numerical aperture into a parallel beam in the infinite space in front of the scan-objective lens, whereby a wavelength-dependent, at least partial compensation of the chromatic distortion of the micro-objective lenses occurs by means of turning the chromatic curve for the illumination wavelength used.

20 Claims, 8 Drawing Sheets

FOREIGN PATENT DOCUMENTS

| | | |
|---|---|---|
| DE | 197 02 753 A | 7/1998 |
| DE | 198 22 869 A1 | 11/1999 |
| DE | 199 51 482 A | 5/2001 |
| DE | 101 07 210 C1 | 10/2002 |
| EP | 0 467 240 A | 1/1992 |
| JP | 11-006958 * 1/1999 | ................ 359/676 |

* cited by examiner

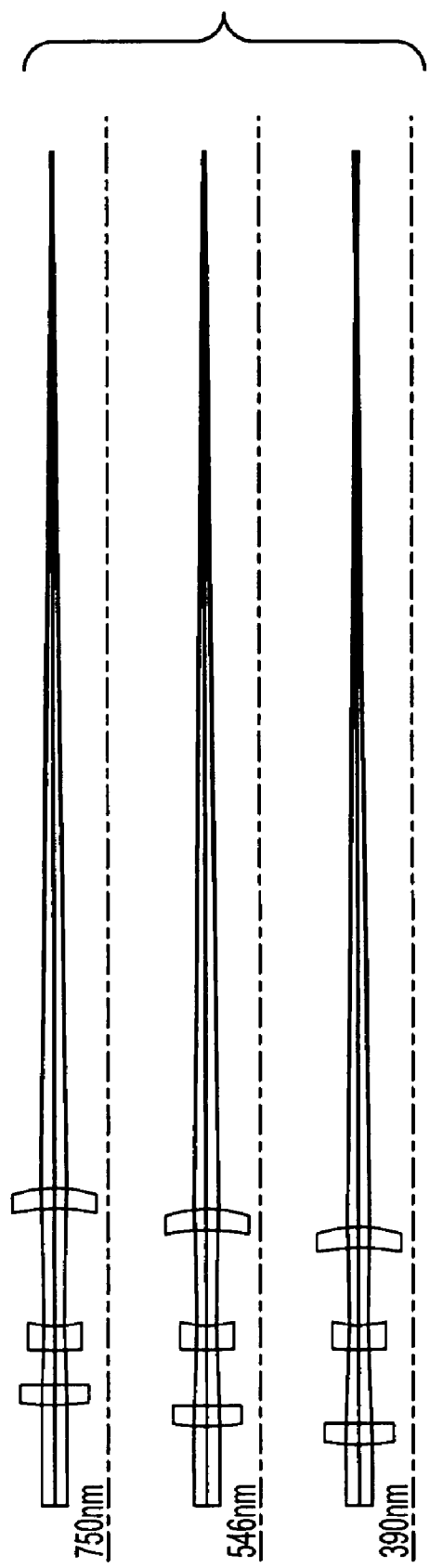

LASER-SCANNING MICROSCOPE WITH COLLIMATOR AND/OR PINHOLE OPTICS

BACKGROUND OF THE INVENTION

The laser-scanning microscope (LSM) represents a modern tool for observing smaller structures [1]. As with the traditional microscope, the object is initially imaged via the objective and tube lenses onto the intermediate image level. In a second imaging step of the LSM the confocal principle is realized on the excitation and detection sides. On the excitation side, the launching occurs by means of a punctiform fiber output via a collimator [2], or directly into the infinite space in front of the scanning objective lens, which is focused onto the intermediate image level of the traditional microscope alignment. For the detection the spectrally staggered fluorescent radiation originating from the objective is used, which falls onto a pinhole for detection via the scanning objective and pinhole optics after the intermediate image level. Excitation and detection channels are separated by means of color separators. With the aid of scanning mirrors, which are arranged in the infinite space between the scan objective and collimator/pinhole optics adjacent of the image of the objective pupil, each image field point can be illuminated and detected. The image is then electronically composed of a detector signal and of the information on the scanner positions. The radiation formation occurs in the objective pupil (FIG. 1).

Due to the fact that optics are often used that correspond to the VIS requirements of traditional light microscopy up to the intermediate image, focal differences occur for the spectral ranges (UV, IR) newly to be developed in dependency of the correction made by the objective and tube lenses. Any systematically occurring parts of lens distortions or aberrations can be compensated in the scanning objective lens. Currently, any chromatic distortions beyond this are compensated by a spectral breakdown of the launching and pinhole optics into channels of varying optical path lengths.

But substantial mechanical adjustment paths often occur even within one channel. This is caused by the mostly strong wavelength dependency of the chromatic distortion within the UV and IR ranges. On the other hand, systems with a high lateral imaging scale (~100) show a sensitive behavior with regard to the transformation of axial position changes from the object into the image space.

One solution is the staggering of the entire collimator group that is positioned conjugated to the pinhole level, which can supply a sufficiently large logarithm for the defocusing up to a certain degree [2]. It differs from solutions that are aimed at varying the illumination diameter by means of variooptics [3].

Literature:

[1] Wilson, Confocal Microscopy, Academy Press

[2] Published Application DE 19702753A1

[3] DE 19654211 A1,
    DE 19901219 A1

BRIEF SUMMARY OF THE INVENTION

However, the following will describe optics with variable transmission distances, and a fixed focal distance, which realizes an imaging from the infinite space into an image level with a finite conjugate distance. It can be used as pinhole or collimator optics for the refocusing of varying wavelengths at a fixed imaging scale.

These optics realize the imaging from the "infinite space" into the imaging level, and meet the following requirements:

1. fixed focal distance $f_G$.

2. large variations of conjugated distances with short adjustment paths, and 3. geometrically optical, as well as chromatic correction for ensuring a large spectral bandwidth for beam diameters and wavelengths respectively required for each application.

BRIEF DESCRIPTION OF THE DRAWINGS

FIG. 3a illustrates the movement of the groups L1 and L3 of the pinhole optics to compensate for chromatic aberration (center lens fixed).

FIGS. 3b-1, 3b-2, 3b-3, and 3b-4 show graphs evaluating the imaging properties for the positions shown in FIG. 3a.

FIGS. 4b-1, 4b-2, 4b-3, and 4b-4 show graphs evaluation the imaging properties for the positions shown in FIG. 4a.

DETAILED DESCRIPTION OF THE INVENTION

Figure 1:
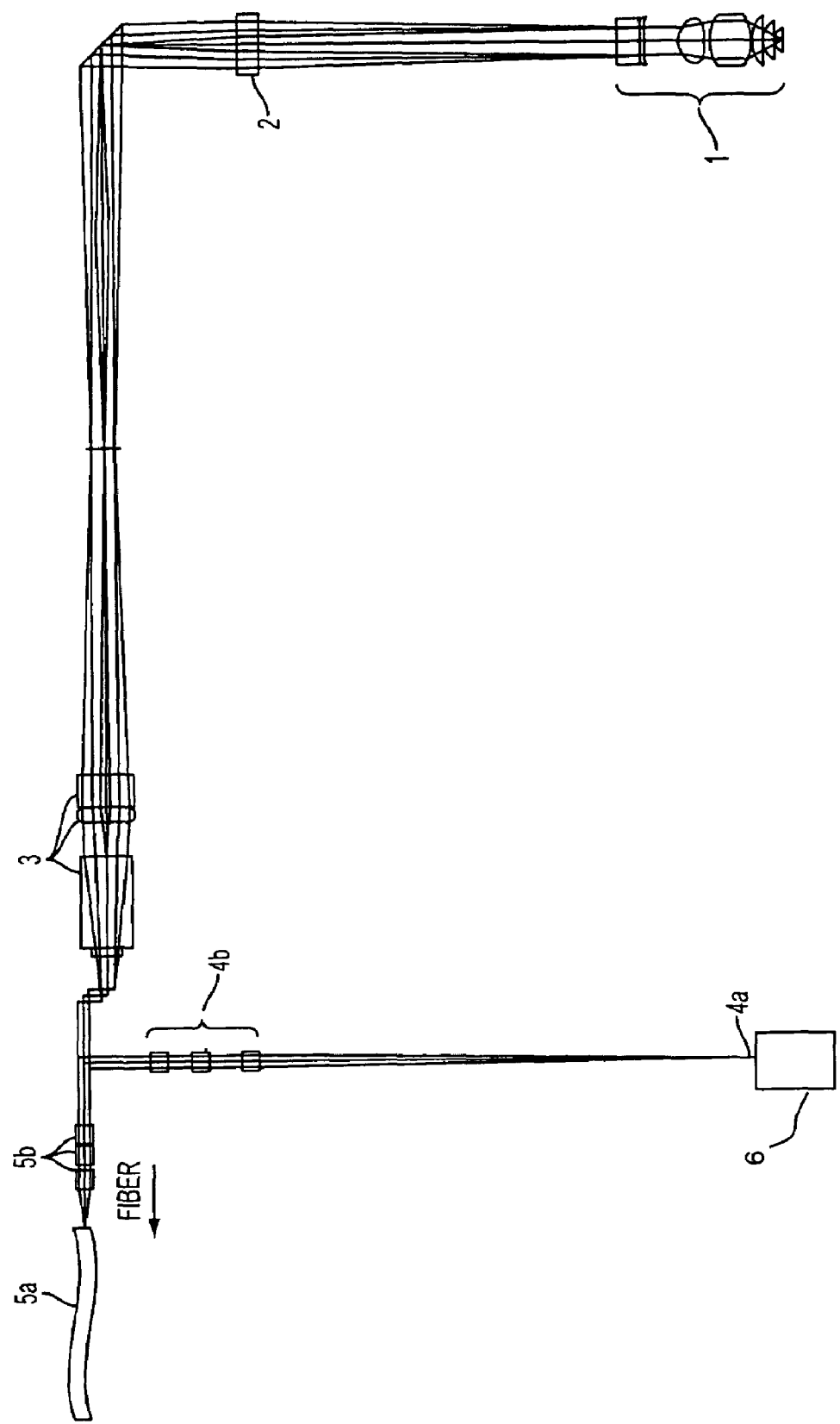
FIG. 1 shows a construction of an LSM comprising an objective lens (1), a tube lens (2), a scan-objective lens with scanner mirrors (3), a pinhole (4a), and pinhole optics (4b) and/or a lighting fiber (5a) and collimator optics (5b) with a fixed focal distance in the following radiation input, and a detector (6) following the pinhole (4a).
Figure 2:
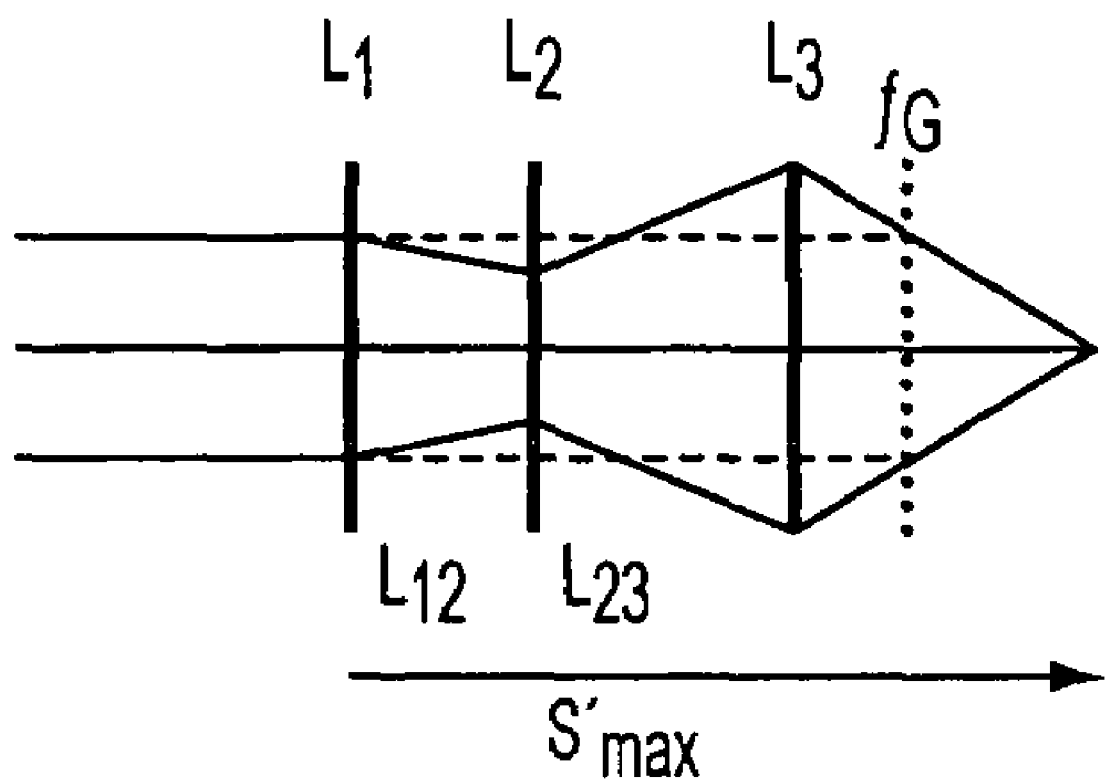
FIG. 2 is a schematic illustration of the collimator/pinhole optics in the direction of the fiber/pinhole.

A solution comprising at least three elements is recommended, of which the first group has a positive refractive power, the second group has a negative refractive power, and the third group has a positive refractive power (FIG. 2, 4). The solution is characterized in that in order to change the transmission distance two groups move relative to the opposite of the remaining group.

This movement compensates the wavelength-dependent position of the image conjugate distance by means of the movement of optical members in such a way that all wavelengths across the spectral range to be selected can be imaged onto one level. A large variation of the image conjugate distance corresponds to a large focusable spectral range within the image level. The solution allows both the retention of a focal distance, and a large variation of the transmission distance.

A particularly favorable embodiment of pinhole optics is achieved, if the first and the third groups are moved firmly connected to each other, and the second group is stationary. In paraxial approximation, the achievable conjugate distance change $\Delta S'_{max}$ can be estimated at approximately the same focal distances of groups 1 and 3 by means of the correlation $$\Delta S'_{max} = \frac{[f_G L]}{[f_2]}$$

whereby $f_G$ represents the total focal distance of the optics of the overall length $L=L_{12}+L_{23}$, and $f_2$ represents the focal distances of the second group.

Embodiment Example for Focal Distance f'=160 (Pinhole Optics)

Focusable pinhole optics with a constant focal distance and pinhole position at low mechanical adjustment movements is intended to be realized with the embodiment f'=160. The goal is to optimally adjust the focus for the interested wavelength range per detection radiation input, and to expand this range.

We have chosen the following as the embodiment example, in which each lens group is replaced by a single lens:

The following defines the sequential number:

1.: first lens surface L1

2.: second lens surface L1

3.: first lens surface L2

4.: second lens surface L2

5.: first lens surface L3:

6.: second lens surface L3

7.: pinhole

Distances: d2: thickness lens L1, d3: distance L1-L2, d4: thickness L2, d5: distance L2-L3, d6: thickness L3, d7: distance L3-pinhole

| Sequential number | Distance [mm] | Radius [mm] | Glass Type | Lens focal length f' | Refraction index $n_e$ | $v_e$ |
|---|---|---|---|---|---|---|
| 1 | infinite | 29.0 | N-FK5 | 59.3 | 1.48914 | 70.18 |
| 2 | 3.0 | infinite | | | | |
| 3 | 10.7 | 43.4 | LF5 | −30.4 | 1.58482 | 40.56 |
| 4 | 3.5 | 12.2 | | | | |
| 5 | 11.0 | −25.3 | N-SK2 | 62.1 | 1.60994 | 56.37 |
| 6 | 3.0 | −15.8 | | | | |
| 7 | 153.3 | infinite | | | | | where $v_e$ is the Abbe number at a wavelength of 546.1 nm (the yellow-green Fraunhofer line "e" in mercury)

Examples for Movement

The condition of the adjustment according to an existing chromatic distortion is illustrated further below.

In order to compensate the chromatic distortion of the objective lenses, the following adjustment paths can be realized by means of the mutual staggering of the front and rear lens groups as opposed to the stationary center lens group.

| | Distance3 [mm] | Distance5 [mm] | Distance7 [mm] |
|---|---|---|---|
| 1. | 8.3 | 13.4 | 150.9 |
| 2. | 10.7 | 11.0 | 153.3 |
| 3. | 9.1 | 12.6 | 151.7 |

Figures 1, 3B:
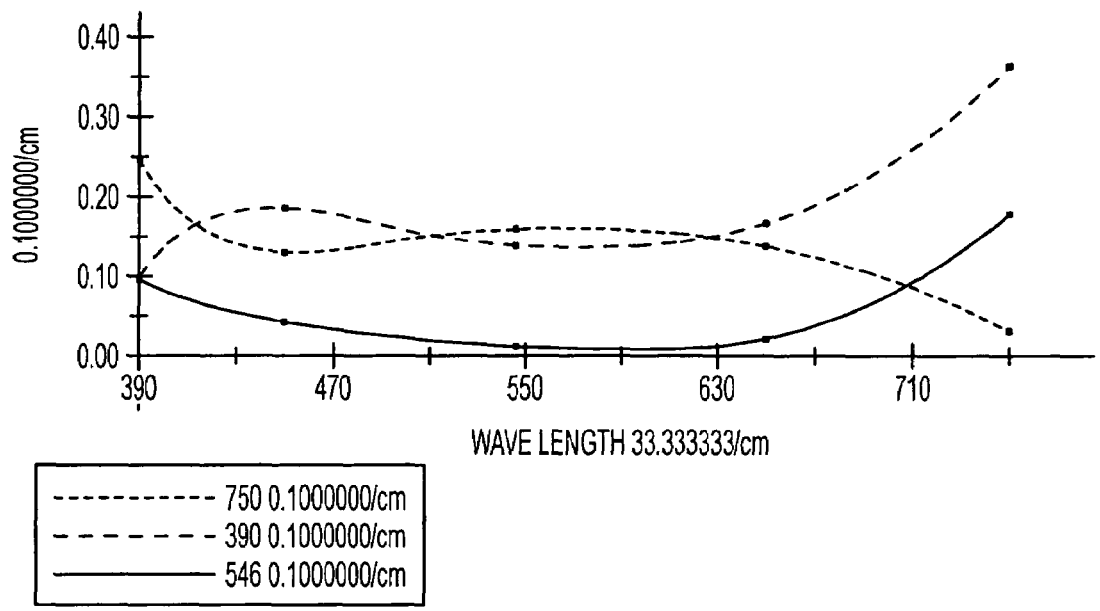
Figures 2, 3B:
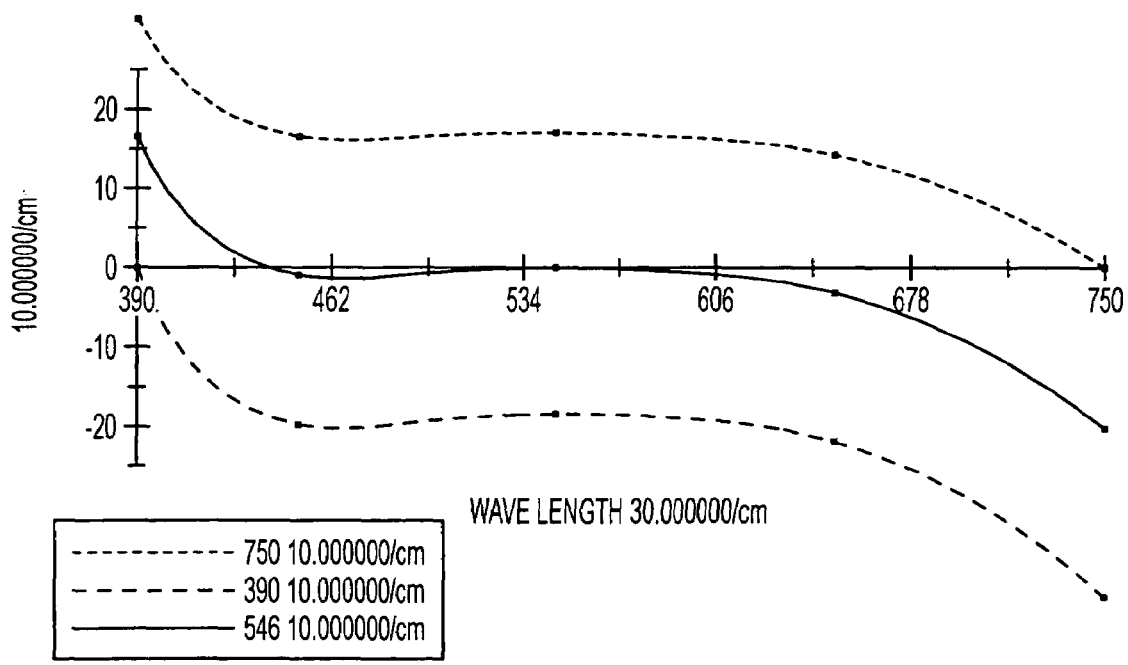
Figures 3, 3B:
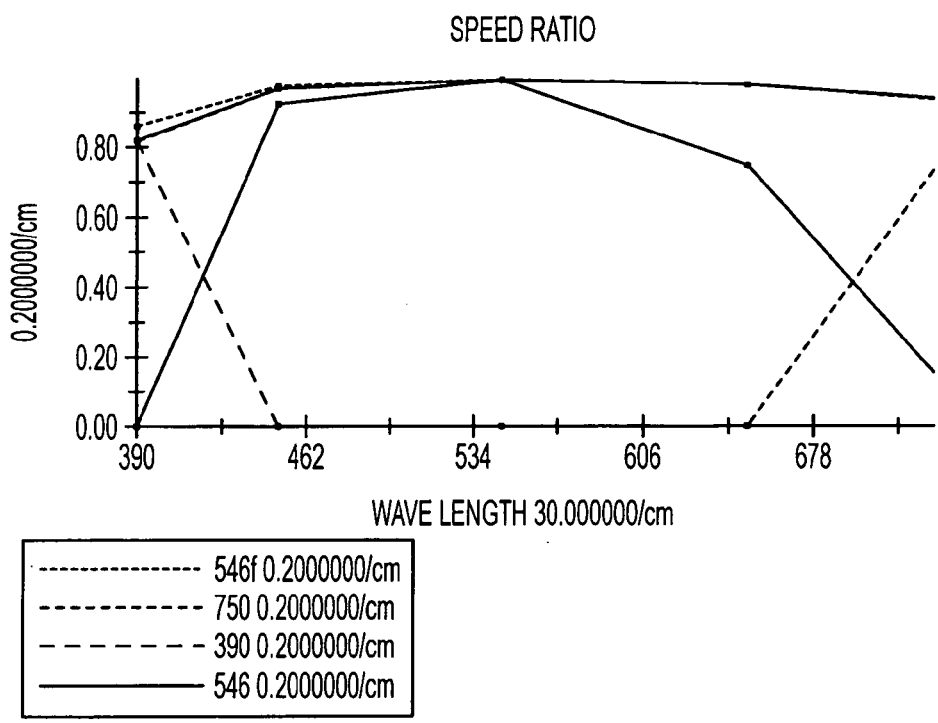
Figures 3, 3B, 4:
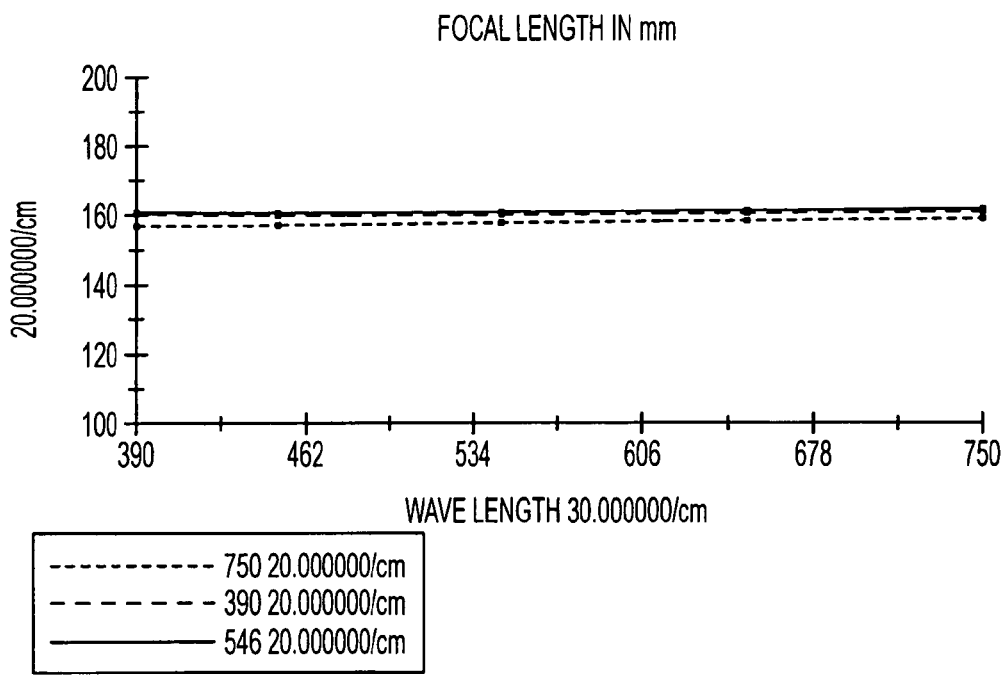
Figure 4A:
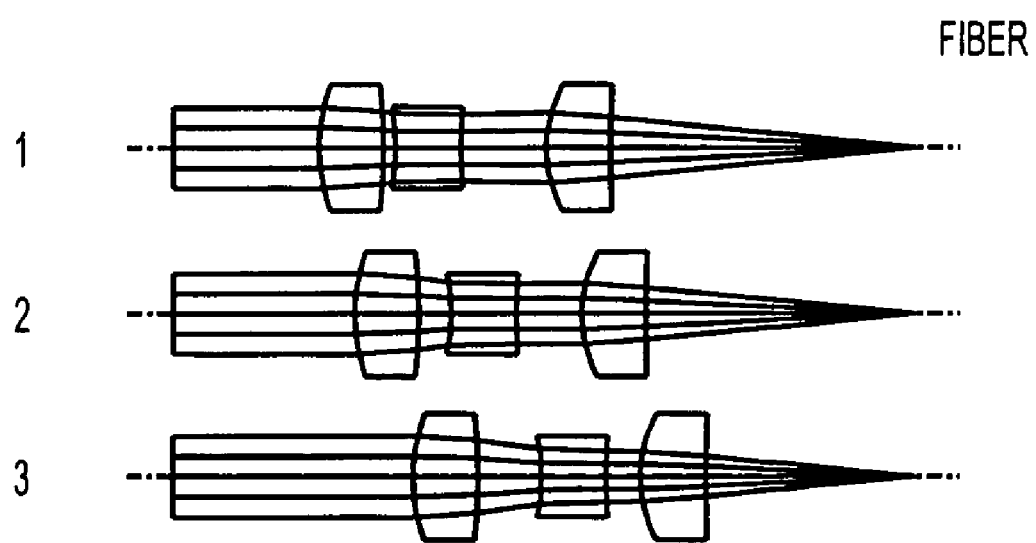
FIG. 4a illustrates collimator movement for the rotation of the chromatic curve with fixed focal length.
Figures 1, 4B:
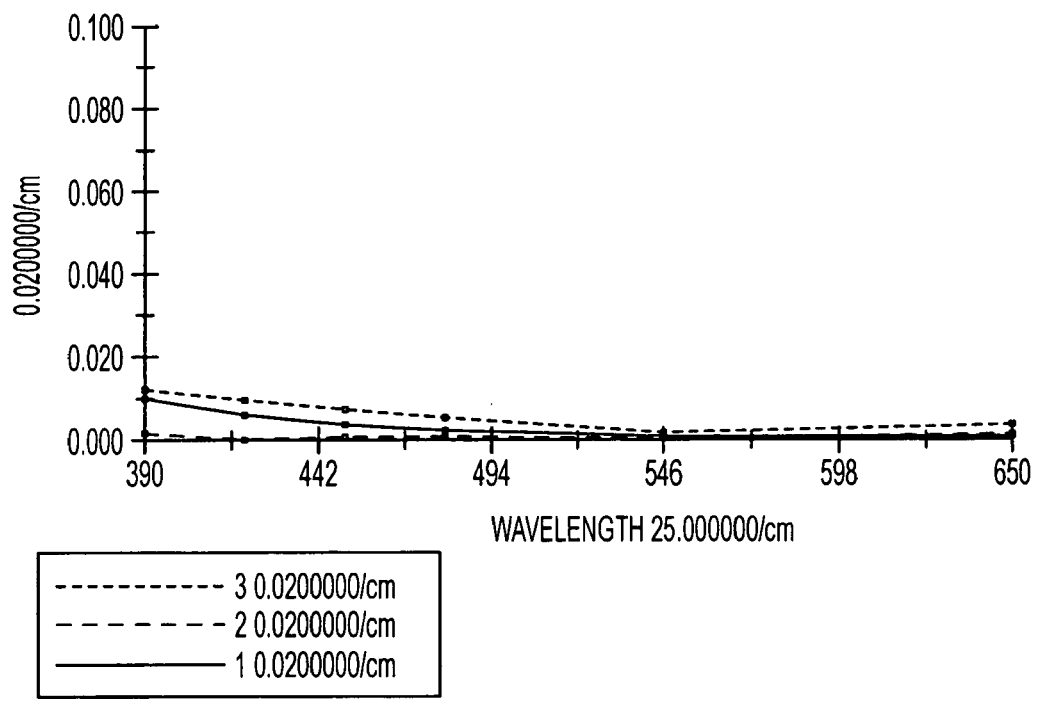
Figures 2, 4B:
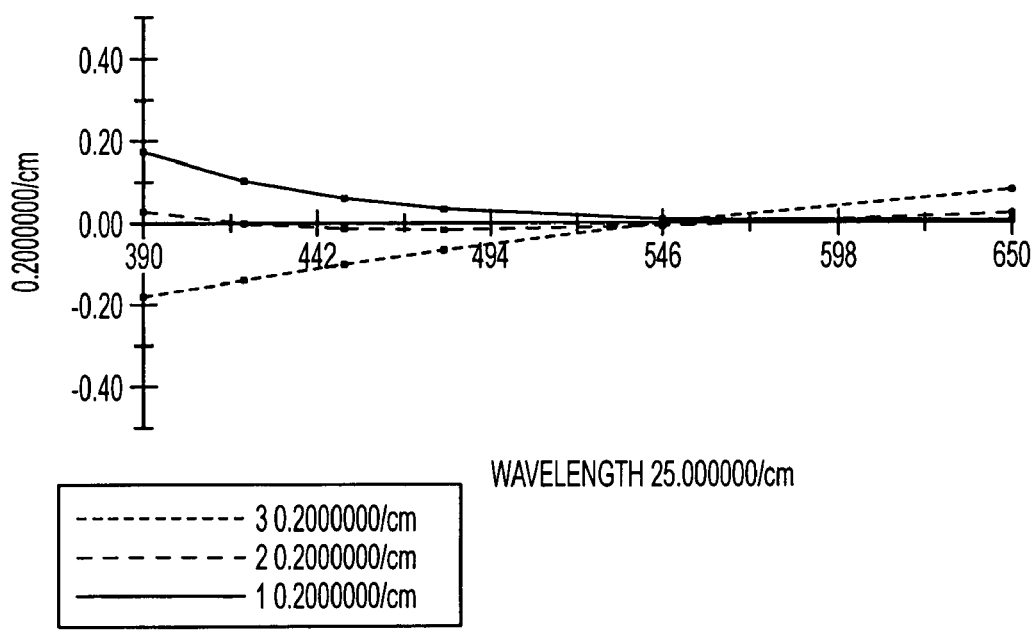
Figures 3, 4B:
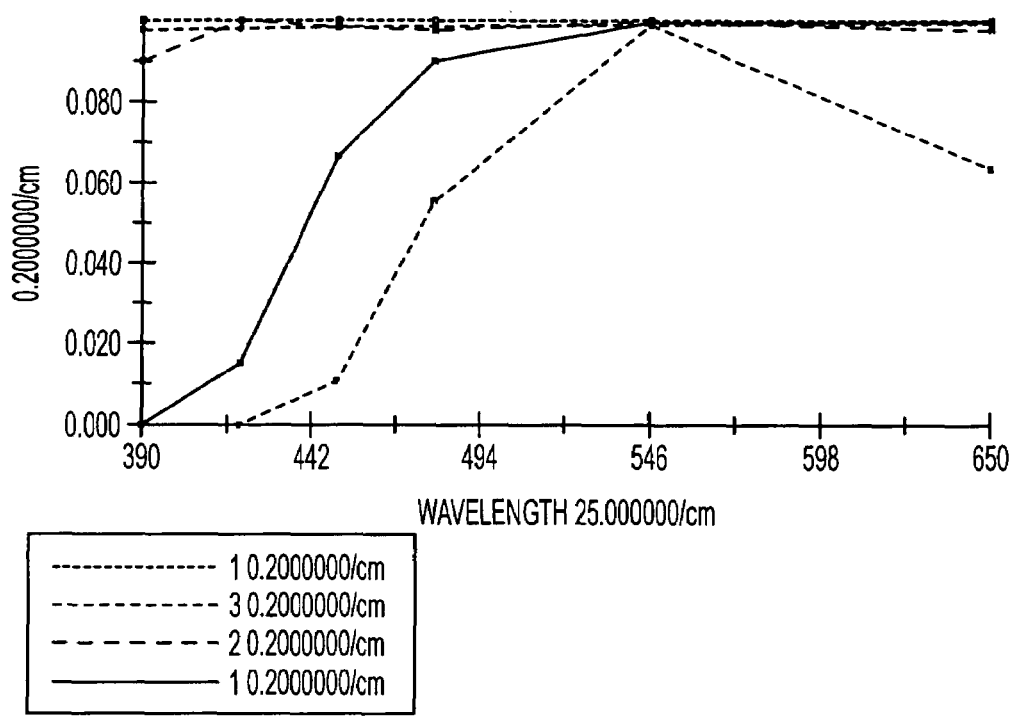
Figures 4, 4B:
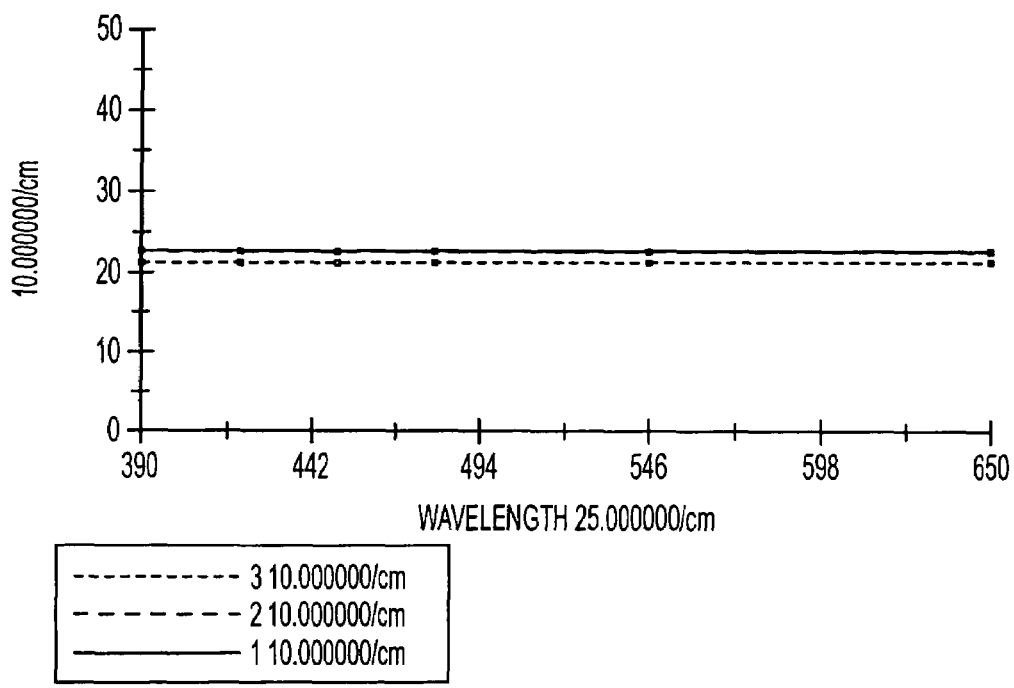

The associated dynamics for refocusing is exemplified in FIG. 3a. For evaluating the functionality of the pinhole optics, the circle of confusion on the pinhole level, the chromatic longitudinal aberration, the definition brightness on the pinhole level, and its value with refocusing, as well as the variation of the focal distance across the wavelength, and the corresponding lens group position are observed in FIG. 3b (in which each lens group is replaced by a single lens). The illustrated lines show the respective sizes when focusing for 390 nm, 546 nm, and 750 nm. It is clear that the chromatic distortion can be compensated by means of the movement of the front and rear lens groups, and that the associated definition brightness reaches its best possible refocused value on the pinhole level. The focal distance remains largely constant. The chromatic distortion CHL ($\lambda$, $z_1$) of the pinhole optics can be approached by the following expression, particularly with regard to $\lambda_0$=546 nm:

$$CHL(\lambda, z_1) = \sum_k c_k(z_1) \lambda^k \quad (1)$$

with $$c_k(z_1) = q_k + r_k z_1 + s_k z_1^2$$

wherein the polynomial coefficients $c_k$, $q_k$, $r_k$, and $s_k$ are constants that depend on the glass type and are related to the wavelength dependency of the refraction indices of the lenses.

The coordinate $z_1$ represents the distance3 between the front and center lens groups that are used in this instance for characterizing the pinhole optics. As an alternative, the air distances distance5, or distance7, which are hereinafter entitled $z_2$ or $z_3$, can be used by means of the combinations $$z_1 = 21.7 \text{ mm} - z_2$$

$$z_1 = z_3 - 142.6 \text{ mm}$$

In order to compensate the chromatic distortion of the objective lenses, the following algorithm is recommended:

The chromatic distortion $\Delta z(\lambda)$ of the objective lenses should be calculated into the pinhole levels $\Delta z'(\lambda) = \beta^2 \Delta z(\lambda)$ by using the imaging scale $\beta$.

This chromatic distortion should be compensated by refocusing the pinhole optics for the wavelength $\lambda$, i.e., $$\Delta z'(\lambda) + CHL(\lambda, z_1) = 0.$$

This results in the solutions for $z_1$, which characterize a suitable adjustment of the movable pinhole optics.

An assessment of the pre-adjustment setting of the above pinhole optics, characterized by the air distance $z_1$ between the front and center lens groups, can occur as follows:

$$z_1 = 0.16 \cdot CHL_0(\lambda) + 10.5 \text{ mm}$$

if $CHL_0(\lambda)$ denotes the chromatic distortion of the objective lens with ideal imaging onto the pinhole level. Furthermore, the following applies:

$$z_2 = 21.7 \text{ mm} - z_1$$

$$z_3 = z_1 + 142.6 \text{ mm}$$

As the pinhole optics have a free movement range $\Delta z_1$ of 21 mm available, chromatic distortions of the objective lenses of up to 130 mm on the pinhole level can be compensated with this arrangement.

6. Embodiment Example for Focal Distance f'=22 (Collimator Optics)

The collimator optics have the task of transferring the point source at the fiber output with a numeric aperture of about 0.07 into a parallel beam with a diameter of 3.2 mm in the infinite space in front of the scan objective lens. For this purpose, optics with a focal distance of 22 mm is required. It should further realize a partial compensation of the chromatic distortion of the objective lenses by means of rotation of the chromatic curve. The imaging of infinite into the fiber output can be performed as follows (where each lens group is replaced by a single lens):

| Sequential number | Distance [mm] | Radius [mm] | Glass Type | Lens focal length f | Refraction index $n_e$ | $v_e$ |
|---|---|---|---|---|---|---|
| 1 | infinite | 10.1 | N-FK5 | 16.4 | 1.48914 | 79.5 |
| 2 | 3.6 | −34.0 | | | | |
| 3 | 1.7 | −11.2 | F2 | −11.6 | 1.62408 | 41.0 |
| 4 | 3.6 | 23.2 | | | | |
| 5 | 3.7 | 7.3 | N-FK5 | 16.1 | 1.48914 | 79.5 |
| 6 | 3.6 | 81.7 | | | | |
| 7 | 14.3 | infinite | | | | | where $v_e$ is the Abbe number at a wavelength of 546.1 nm (the yellow-green Fraunhofer line "e" in mercury).

Distances:

d2: thickness lens L1, d3: distance L1-L2, d4: thickness L2, d5: distance L2-L3, d6: thickness L3, d7: distance L3-fiber output Adjustments are made so that with a fixed focal distance one fixed wavelength each—particularly $\lambda_0$=546 nm—remains focused, and another wavelength receives a defined chromatic distortion, which serves for the compensation of the chromatic distortion of the objective lenses. The rotation of the chromatic curve at a fixed focal distance is realized by means of the movement of the center lens group as opposed to the two exterior, firmly connected lens groups.

| Distance3 [mm] | Distance5 [mm] | Distance7 [mm] | Filing [mm] at 390 nm |
|---|---|---|---|
| 1.7 | 3.7 | 14.3 | 0.17 |
| 2.9 | 2.5 | 12.0 | 0.03 |
| 5.1 | 0.3 | 8.1 | −0.18 |

FIG. 3a shows the adjustment range of this arrangement. The associated characterization reveals the capability of the collimator group of rotation of the chromatic distortion by 0.35 mm in the UV range.

Two sizes are necessary in order to describe the dynamics of the collimator movement. They are the air distance7 of the last lens group to the fiber output $z_3$, as well as the air distance5 of the center lens group to the last lens $z_2$. The viewed function assumes a coupled movement $z_2$ ($z_3$) in order to focus a wavelength ($\lambda_0$=546 nm). The following applies particularly to the refractive power distribution selected above:

$$z_2(z_3=0.55z_3-4.2 \text{ mm})$$

The chromatic distortion of the collimator optics can then be expressed as CHL ($z_3, \lambda$). The (1) applies to the changed development coefficient $$c_k(z_3)=q_k+r_k z_3$$

wherein the polynomial coefficients $c_k$, $q_k$, and $r_k$ are constants that depend on the glass type and are related to the wavelength dependency of the refraction indices of the lenses.

We want to find such a position $z_3$, in which the chromatic distortion between the wavelengths $\lambda_1$ and $\lambda_2$ takes on a defined value in such a way that it is compensated together with that of the objective lenses.

$$CHL(\lambda_1,z_3)-CHL(\lambda_2,z_3)=-CHL_0(\lambda_1,\lambda_2)$$

From this condition, a position $z_3$ of the last lens group follows opposite of the fiber, as well as the associated position $z_2$ ($z_3$) of the center lens group, insofar as the respective movement space is sufficient. An assessment of the pre-adjustment of the collimator to the rotation of the chromatic curve in such a way that the chromatic distortion $CHL_0$ ($\lambda_2$)–$CHL_0$ ($\lambda_1$) caused by the objective lens is compensated on the level of the fiber launching between the two wavelengths $\lambda_1$ and $\lambda_2$ by means of the collimator at the same focal distance, is given by means of the correlations $$z_2 = 3.7 \text{ mm} - 0.24 \text{ μm} \cdot \frac{CHL_O(\lambda_2) - CHL_O(\lambda_1)}{\lambda_2 - \lambda_1}$$

$$z_3 = 1.8 z_2 + 7.5 \text{ mm}$$

$$z_1 = 5.4 \text{ mm} - z_2$$

The air distance3 between the front and center lens groups $z_1$ results from the mutual staggering of the front and rear lens groups.

The method for refocusing and rotation of the chromatic longitudinal curve with the aid of pinhole optics, as well as of the collimator optics, is particularly advantageous, if a) chromatic distortion of the objective lenses dominate, b) the system can be refocused (small spherical aberrations, good transmission), and c) the contribution of a scan-objective lens for the chromatic distortion can be neglected.

The invention claimed is:

1. Laser-scanning microscope comprising:
   at least one detection radiation input,
   a detector,
   a pinhole installed in front of the detector,
   pinhole optics with variable transmission lengths and a fixed focal distance for focusing varying wavelengths of detected light onto the plane of the pinhole on a detection radiation path, which realizes imaging from infinite space into an image level with a finite conjugate distance,
   an optical fiber having an output,
   at least one light source launched via the optical fiber,
   a scan-objective lens
   a plurality of microscope-objective lenses, and
   collimator optics with a fixed focal distance and a variable conjugate distance down-stream from the fiber output, for transferring the point source at the fiber output with a numerical aperture into a parallel beam in the infinite space in front of the scan-objective lens,
   wherein the collimator optics include:
      at least first, second, and third groups of lenses, of which the first group has a positive refractive power, the second group has a negative refractive power, and the third group has a positive refractive power, and
      means for accomplishing relative movement between the second group of lenses and the first and third groups of lenses, wherein the relative movement between the second group of lenses and the first and third groups results in the rotation of the chromatic curve at a fixed focal distance, and wherein rotation of the chromatic curve for the illumination wavelength used results in a wavelength-dependent, at-least-partial compensation of the chromatic distortion of the microscope-objective lenses.

2. Laser-scanning microscope according to claim 1, wherein the pinhole optics include at least first, second, and third groups of lenses, of which the first group has a positive refractive power, the second group has a negative refractive power, and the third group has a positive refractive power.

3. Laser-scanning microscope according to claim 2, wherein two groups of the pinhole optics move relatively opposite of the remaining group for changing the transmission length.

4. Laser-scanning microscope according to claim 2 wherein the first and the third groups of the pinhole optics are moved firmly connected to each other, and the second group is stationary.

5. Laser-scanning microscope according to claim 2, wherein the maximum conjugate distance change $\Delta S'_{max}$ is determined by the correlation at approximately the same focal distance of the first and third groups, $$\Delta S'_{max} = \left| \frac{f_G L}{f_2} \right|$$

wherein $f_G$ represents the total focal distance of the optics of the overall length, $L=L_{12}+L_{23}$, where $L_{12}$ is the distance between the first and second groups of lenses $L_1$ and $L_2$, and where $L_{23}$ is the distance between the second and third groups of lenses $L_2$ and $L_3$, and $f_2$ represent the focal distance of the second group.

6. Laser-scanning microscope according to claim 1, with following dimensions and distances:

| Sequential number | Distance [mm] | Radius [mm] | Glass Type | Lens focal length f | Refraction index $n_e$ | $v_\epsilon$ |
|---|---|---|---|---|---|---|
| 1 | infinite | 29.0 | N-FK5 | 59.3 | 1.48914 | 70.18 |
| 2 | 3.0 | infinite | | | | |
| 3 | 10.7 | 43.4 | LF5 | −30.4 | 1.58482 | 40.56 |
| 4 | 3.5 | 12.2 | | | | |
| 5 | 11.0 | −25.3 | N-SK2 | 62.1 | 1.60994 | 56.37 |
| 6 | 3.0 | −15.8 | | | | |
| 7 | 153.3 | infinite | | | | | where $v_\epsilon$ is the Abbe number at a wavelength of 546.1 nm (the yellow-green Fraunhofer line "e" in mercury).

7. Laser-scanning microscope according to claim 6, with following movement of the first, second, and third groups of lenses:

| | Distance3 [mm] | Distance5 [mm] | Distance7 [mm] |
|---|---|---|---|
| 1. | 8.3 | 13.4 | 150.9 |
| 2. | 10.7 | 11.0 | 153.3 |
| 3. | 9.1 | 12.6 | 151.7 | wherein distance3 is the distance between the first and second groups of lenses, distance5 is air distance between the second group of lenses and the third group of lenses, and distance7 is the air distance of the third group of lenses to the fiber output.

8. Laser-scanning microscope according to claim 1, wherein the chromatic distortion CHL $(\lambda, z_1)$ of the pinhole optics is approached by means of the following expression:

$$CHL(\lambda, z_1) = \sum_k c_k(z_1) \lambda^k$$

with $$c_k(z_1) = q_k + r_k z_1 + s_k z_1^2$$

wherein k is a counting index for the sum and the maximum k depends on the spectral range of interest and of the glass type, the polynomial coefficients $C_k$, $q_k$, $s_k$, and $r_k$ are constants that depend on the glass type and are related to the wavelength dependency of the refraction indices of the lens groups, $\lambda$ is the wavelength, and the coordinate $z_1$ represents the distance between the first and second lens groups.

9. Laser-scanning microscope according to claim 8,
further comprising objective lenses having a chromatic distortion $\Delta z(\lambda)$, wherein the compensation of the chromatic distortion of the objective lenses occurs by means of the following steps:
the chromatic distortion $\Delta z(\lambda)$ of the objective lenses is calculated into the pinhole level $\Delta z'(\lambda) = \beta^2 \Delta z(\lambda)$ using the imaging scale $\beta$
the calculation of the chromatic distortion into the pinhole level $\Delta z'(\lambda) = \beta^2 \Delta z(\lambda)$ is compensated by refocusing of the pinhole optics for the wavelength $\lambda$, according to the equation $$\Delta z'(\lambda) + CHL(\lambda, z_1) = 0$$

from which, solutions are calculated for the distance $z_1$ between the first and second lens groups, which characterize an adjustment of the pinhole optics.

10. Laser-scanning microscope according to claim 9,
wherein an assessment of the pre-adjustment setting of the pinhole optics, characterized by the air distance $z_1$ between the first and second lens groups with:

$$z_1 = 0.16 \cdot CHL_0(\lambda) + 10.5 \text{ mm},$$

wherein $CHL_0(\lambda)$ denotes the chromatic distortion of the objective lens with an ideal imaging into the pinhole level.

11. Laser-scanning microscope according to claim 1, further comprising several detection radiation inputs, wherein at least one detection radiation input is attached to an interface in the microscope, which has an infinite radiation input.

12. Laser-scanning microscope according to claim 1, wherein the collimator optics have a focal distance of about 22 mm.

13. Laser-scanning microscope according to claim 1, wherein:
the first and third groups of lenses are arranged as front and last, exterior groups of lenses and the second group of lenses is arranged as a center group of lenses between the exterior groups of lenses, and
the first and third groups of lenses are firmly connected to each other.

14. Laser-scanning microscope comprising:
at least one detection radiation input,
a detector,
a pinhole installed in front of the detector, and
pinhole optics with variable transmission lengths and a fixed focal distance for focusing varying wavelengths of detected light onto the plane of the pinhole on a detection radiation path, which realizes imaging from infinite space into an image level with a finite conjugate distance,
an optical fiber having an output,
at least one light source launched via the optical fiber,
a scan-objective lens,
a plurality of microscope-objective lenses, and
collimator optics with a fixed focal distance and a variable conjugate distance down-stream from the fiber output, for transferring the point source at the fiber output with a numerical aperture into a parallel beam in the infinite space in front of the scan-objective lens, and wherein a wavelength-dependent, at-least-partial compensation of the chromatic distortion of the microscope-objective lenses occurs by means of rotation of the chromatic curve for the illumination wavelength used,
wherein the collimator optics transfer the point source at the fiber output with a numerical aperture of 0.07 into a parallel beam with the diameter of 3.2 mm in the infinite space in front of the scan-objective lens.

15. Laser-scanning microscope comprising:
at least one detection radiation input,
a detector,
a pinhole installed in front of the detector, and
pinhole optics with variable transmission lengths and a fixed focal distance for focusing varying wavelengths of detected light onto the plane of the pinhole on a detection radiation path, which realizes imaging from infinite space into an image level with a finite conjugate distance,
an optical fiber having an output,
at least one light source launched via the optical fiber,
a scan-objective lens,
a plurality of microscope-objective lenses, and
collimator optics with a fixed focal distance and a variable conjugate distance down-stream from the fiber output, for transferring the point source at the fiber output with a numerical aperture into a parallel beam in the infinite space in front of the scan-objective lens, and wherein a wavelength-dependent, at-least-partial compensation of the chromatic distortion of the microscope-objective lenses occurs by means of rotation of the chromatic curve for the illumination wavelength used,
with the following dimensions and distances:

| Sequential number | Distance [mm] | Radius [mm] | Glass Type | Lens focal length f | Refraction index $n_e$ | $v_e$ |
|---|---|---|---|---|---|---|
| 1 | infinite | 10.1 | N-FK5 | 16.4 | 1.48914 | 79.5 |
| 2 | 3.6 | −34.0 | | | | |
| 3 | 1.7 | −11.2 | F2 | −11.6 | 1.62408 | 41.0 |
| 4 | 3.6 | 23.2 | | | | |
| 5 | 3.7 | 7.3 | N-FK5 | 16.1 | 1.48914 | 79.5 |
| 6 | 3.6 | 81.7 | | | | |
| 7 | 14.3 | infinite | | | | | where $v_e$ is the Abbe number at a wavelength of 546.1 nm (the yellow-green Fraunhofer line "e" in mercury).

16. Laser-scanning microscope according to claim 15, wherein the collimator optics include at least first, second, and third groups of lenses, of which the first group has a positive refractive power, the second group has a negative refractive power, and the third group has a positive refractive power, wherein the first and third groups of lenses are arranged as front and last, exterior groups of lenses and the second group of lenses is arranged as a center group of lenses between the exterior groups of lenses, wherein the two exterior groups of lenses are fixed, and wherein the rotation of the chromatic curve at a fixed focal distance is realized by means of the movement of the center groups of lenses relative to the two exterior, fixed groups of lenses as follows:

| Distance3 [mm] | Distance5 [mm] | Distance7 [mm] | Filing [mm] at 390 nm |
|---|---|---|---|
| 1.7 | 3.7 | 14.3 | 0.17 |
| 2.9 | 2.5 | 12.0 | 0.03 |
| 5.1 | 0.3 | 8.1 | −0.18 | wherein distance3 is the distance between the front and center groups of lenses, distance5 is the air distance between the center group of lenses and the last group of lenses, and distance7 is the air distance of the last group of lenses to the fiber output.

17. Laser-scanning microscope comprising:
at least one detection radiation input,
a detector,
a pinhole installed in front of the detector, and
pinhole optics with variable transmission lengths and a fixed focal distance for focusing varying wavelengths of detected light onto the plane of the pinhole on a detection radiation path, which realizes imaging from infinite space into an image level with a finite conjugate distance,
an optical fiber having an output,
at least one light source launched via the optical fiber,
a scan-objective lens,
a plurality of microscope-objective lenses, and
collimator optics with a fixed focal distance and a variable conjugate distance down-stream from the fiber output, for transferring the point source at the fiber output with a numerical aperture into a parallel beam in the infinite space in front of the scan-objective lens, and wherein a wavelength-dependent, at-least-partial compensation of the chromatic distortion of the microscope-objective lenses occurs by means of rotation of the chromatic curve for the illumination wavelength used,
wherein the collimator optics include at least first, second, and third groups of lenses, of which the first group has a positive refractive power, the second group has a negative refractive power, and the third group has a positive refractive power, and wherein a coupled movement $z_2$ ($z_3$) of the second and the third groups of lenses occurs in order to focus a wavelength,
wherein $$z_2(z_3) = 0.55 z_3 - 4.2 \text{ mm}$$

wherein $z_2$ is the air distance of the second group of lenses to the third group of lenses opposite the illumination direction, and $z_3$ is the air distance of the third group of lenses to the fiber output.

18. Laser-scanning microscope comprising:
at least one detection radiation input,
a detector,
a pinhole installed in front of the detector, and
pinhole optics with variable transmission lengths and a fixed focal distance for focusing varying wavelengths of detected light onto the plane of the pinhole on a detection radiation path, which realizes imaging from infinite space into an image level with a finite conjugate distance,
an optical fiber having an output,
at least one light source launched via the optical fiber,
a scan-objective lens,
a plurality of microscope-objective lenses, and
collimator optics with a fixed focal distance and a variable conjugate distance down-stream from the fiber output, for transferring the point source at the fiber output with a numerical aperture into a parallel beam in the infinite space in front of the scan-objective lens, and wherein a wavelength-dependent, at-least-partial compensation of the chromatic distortion of the microscope-objective lenses occurs by means of rotation of the chromatic curve for the illumination wavelength used,
wherein the collimator optics include at least first, second, and third groups of lenses, wherein the chromatic distortion $CHL_O(\lambda_2) - CHL_O(\lambda_1)$ caused by the microscope-objective lens is compensated on the level of the fiber launching between the two wavelengths $\lambda_1$ and $\lambda_2$ by means of the collimator optics at the same focal distance, is given by means of the correlations $$z_2 = 3.7 \text{ mm} - 0.24 \text{ μm} \cdot \frac{CHL_O(\lambda_2) - CHL_O(\lambda_1)}{\lambda_2 - \lambda_1}$$

$$z_3 = 1.8 z_2 + 7.5 \text{ mm}$$

$$z_1 = 5.4 \text{ mm} - z_2$$

where:

$z_1$=the air distance between the first and second groups of lenses, $z_2$=the air distance of the second group of lenses to the third group of lenses opposite to the illumination direction, and $z_3$=the air distance of the third group of lenses to the fiber output.

19. Laser-scanning microscope according to claim 13, wherein the first and third groups of lenses are moved relative to the second so that with a fixed focal distance one fixed wavelength remains focused, and another wavelength receives a defined chromatic distortion, which serves for the compensation of the chromatic distortion of the objective lenses.

20. Laser-scanning microscope according to claim 19, wherein the fixed wavelength is 546 nm.

* * * * *